United States Patent
Baum et al.

(10) Patent No.: US 7,848,438 B2
(45) Date of Patent: Dec. 7, 2010

(54) METHOD AND APPARATUS FOR PILOT SIGNAL TRANSMISSION

(75) Inventors: Kevin L. Baum, Rolling Meadows, IL (US); Brian K. Classon, Palatine, IL (US); Vijay Nangia, Algonquin, IL (US); Timothy A. Thomas, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 889 days.

(21) Appl. No.: 11/672,275

(22) Filed: Feb. 7, 2007

(65) Prior Publication Data

US 2007/0189404 A1 Aug. 16, 2007

Related U.S. Application Data

(60) Provisional application No. 60/773,249, filed on Feb. 14, 2006.

(51) Int. Cl.
*H04L 27/28* (2006.01)

(52) U.S. Cl. .......... 375/260; 375/299; 375/346
(58) Field of Classification Search ........ 375/260, 375/267, 299, 346, 347
See application file for complete search history.

(56) References Cited

U.S. PATENT DOCUMENTS

| | | | |
|---|---|---|---|
| 6,240,148 B1 * | 5/2001 | Shou et al. .......... | 375/347 |
| 2002/0172184 A1 * | 11/2002 | Kim et al. .......... | 370/344 |
| 2003/0165185 A1 * | 9/2003 | Arima et al. .......... | 375/147 |
| 2005/0226140 A1 | 10/2005 | Zhuang et al. | |
| 2006/0018411 A1 | 1/2006 | Gore et al. | |

* cited by examiner

*Primary Examiner*—David B Lugo
(74) *Attorney, Agent, or Firm*—Roland K. Bowler, II

(57) ABSTRACT

A pilot (or reference) transmission scheme is utilized where different transmitters are assigned pilot sequences with possibly different cyclic time shifts. A pilot signal is transmitted concurrently by the transmitters in a plurality of pilot blocks, and a receiver processes the plurality of received pilot blocks to recover a channel estimate for at least one of the transmitters while suppressing the interference due to the pilot signals from the other transmitters.

27 Claims, 13 Drawing Sheets

METHOD AND APPARATUS FOR PILOT SIGNAL TRANSMISSION

FIELD OF THE DISCLOSURE

The present invention relates generally to pilot signal transmission and in particular to a method and apparatus for pilot signal transmission in a communication system.

BACKGROUND

A pilot signal (or reference signal) is commonly used for communication systems to enable a receiver to perform a number of critical functions, including but not limited to, the acquisition and tracking of timing and frequency synchronization, the estimation and tracking of desired channels for subsequent demodulation and decoding of information data, the estimation and monitoring of characteristics of other channels for handoff, interference suppression, etc. Several pilot schemes can be utilized by communication systems and typically comprise the transmission of a known sequence at known time intervals. A receiver, knowing the sequence only or knowing the sequence and time interval in advance, utilizes this information to perform the abovementioned functions.

For the uplink of future broadband systems, single-carrier based approaches with orthogonal frequency division are of interest. These approaches, particularly Interleaved Frequency Division Multiple Access (IFDMA) and its frequency-domain related variant known as DFT-Spread-OFDM (DFT-SOFDM), are attractive because of their low peak-to-average power ratio (PAPR), frequency domain orthogonality between users, and low-complexity frequency domain equalization.

In order to retain the low PAPR property of IFDMA/DFT-SOFDM, only a single IFDMA code should be transmitted by each user. This leads to restrictions on the pilot symbol format. In particular, a time division multiplexed (TDM) pilot block should be used, where data and pilots of a particular user are not mixed within the same IFDMA block. This allows the low PAPR property to be preserved and also enables the pilot to remain orthogonal from the data in multipath channels, since there is conventionally a cyclic prefix between blocks. An example is shown in FIG. 1, where an IFDMA pilot block and subsequent IFDMA data blocks for a transmission frame or burst are shown.

While the TDM pilot approach is attractive, there are a limited number of separable or orthogonal pilot signals available for use by different transmitters in a system. Therefore a need exists for a method and apparatus for pilot signal transmission that increases the number of separable pilot signals.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

To address the above-mentioned need, a method and apparatus for pilot or reference signal transmission is disclosed herein. In particular, a pilot (or reference) transmission scheme is utilized where different transmitters are assigned pilot sequences with possibly different cyclic time shifts. A pilot signal is transmitted concurrently by the transmitters in a plurality of pilot blocks, and a receiver processes the plurality of received pilot blocks to recover a channel estimate for at least one of the transmitters while suppressing the interference due to the pilot signals from the other transmitters.

Figure 1:
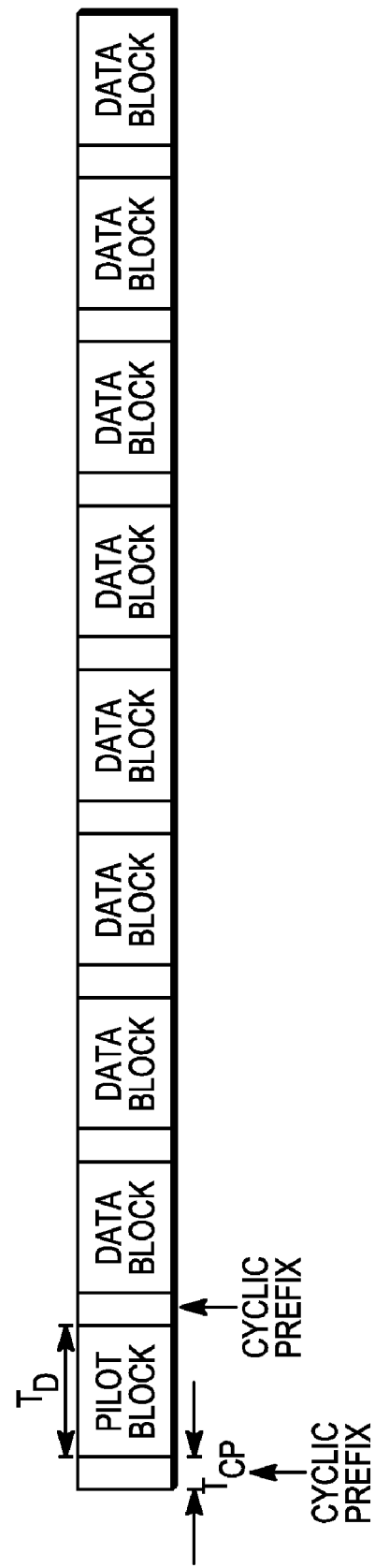
FIG. 1 illustrates data blocks and a pilot block in an IFDMA system or a DFT-SOFDM system.
Figure 2:
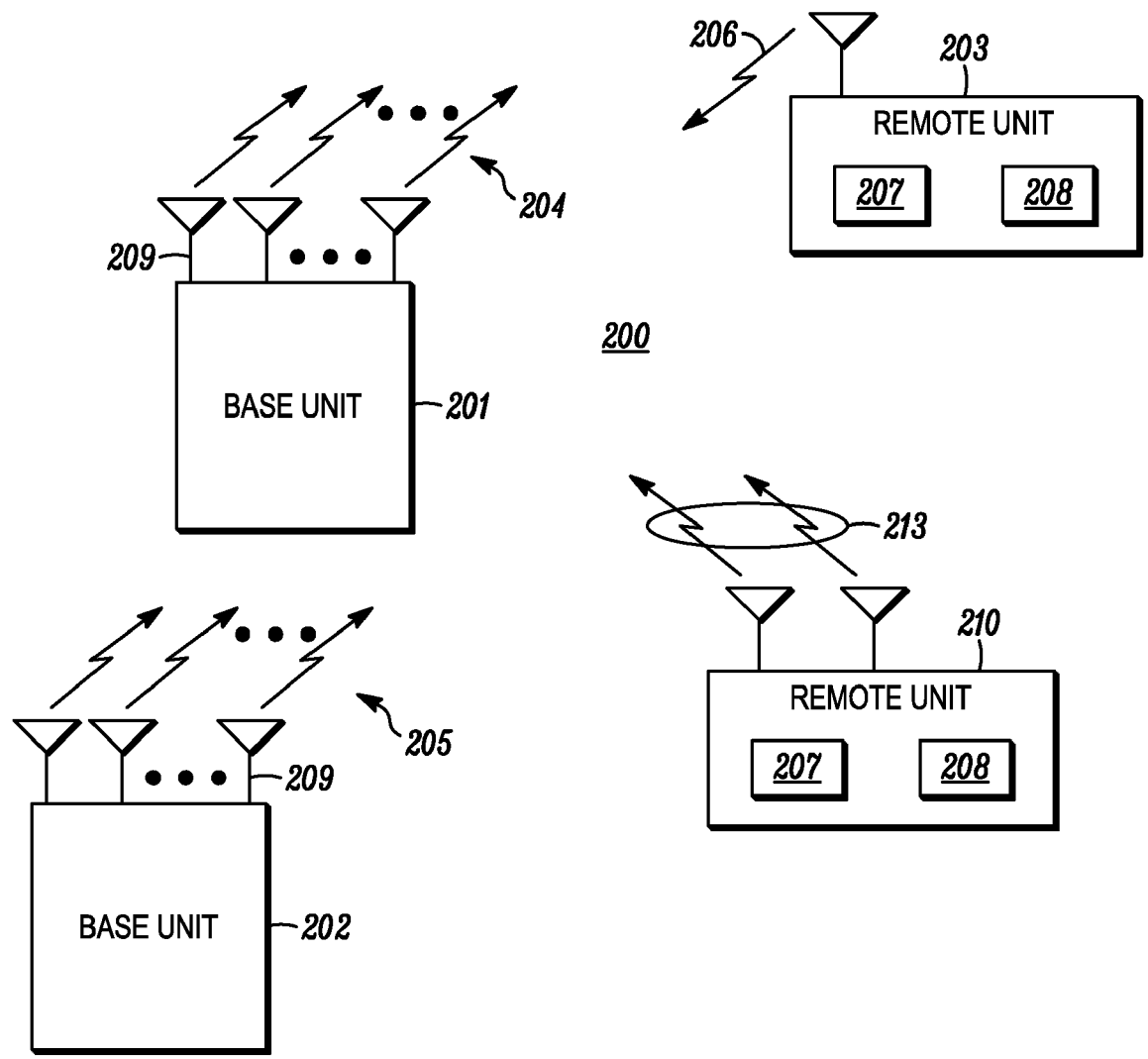
FIG. 2 is a block diagram of a communication system that utilizes pilot transmissions.

Turning now to the drawings, where like numerals designate like components, FIG. 2 is a block diagram of a communication system 200 that utilizes pilot transmissions. Communication system 200 preferably utilizes either OFDMA or a next generation single-carrier based FDMA architecture for uplink transmissions 206, such as interleaved FDMA (IFDMA), Localized FDMA (LFDMA), DFT-spread OFDM (DFT-SOFDM) with IFDMA or LFDMA. While these can be classified as single-carrier based transmission schemes with a much lower peak-to average power ratio than OFDM, they can also be classified as multicarrier schemes because they are block-oriented like OFDM and can be configured to occupy only a certain set of "subcarriers" in the frequency domain like OFDM. Thus IFDMA and DFT-SOFDM can be classified as both single-carrier and multicarrier since they have single carrier characteristics in the time domain and multicarrier characteristics in the frequency domain. On top of the baseline transmission scheme, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and/or frequency division multiplexing/multiple access techniques, or a combination of these various techniques.

Figure 3:
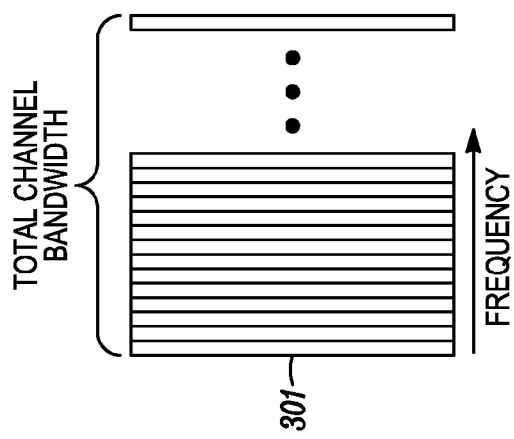
FIG. 3 illustrates multiple subcarrier use in an IFDMA system or a DFT-SOFDM system.

As one of ordinary skill in the art will recognize, even though IFDMA and DFT-SOFDM can be seen as single-carrier-based schemes, during operation of an IFDMA system or a DFT-SOFDM system, multiple subcarriers (e.g., 768 subcarriers) are utilized to transmit data. This is illustrated in FIG. 3. As shown in FIG. 3 the wideband channel is divided into many narrow frequency bands (subcarriers) 301, with data being transmitted in parallel on subcarriers 301. However, a difference between OFDMA and IFDMA/DFT-SOFDM is that in OFDMA each data symbol is mapped to a particular subcarrier, whilst in IFDMA/DFT-SOFDM a portion of each data symbol is present on every occupied subcarrier (the set of occupied subcarriers for a particular transmission may be a either a subset or all of the subcarriers). Hence in IFDMA/DFT-SOFDM, each occupied subcarrier contains a mixture of multiple data symbols.

Returning to FIG. 2, communication system 200 includes one or more base units 201 and 202, and one or more remote units 203 and 210. A base unit comprises one or more transmitters and one or more receivers that serve a number of remote units within a sector. The number of transmitters may be related, for example, to the number of transmit antennas at the base unit. A base unit may also be referred to as an access point, access terminal, Node-B, or by other terminology used in the art. A remote unit comprises one or more transmitters and one or more receivers. The number of transmitters may be related, for example, to the number of transmit antennas at the remote unit. A remote unit may also be referred to as a subscriber unit, a mobile unit, user equipment, a user, a terminal, a subscriber station, a user terminal or by other terminology used in the art. As known in the art, the entire physical area served by the communication network may be divided into cells, and each cell may comprise one or more sectors. When multiple antennas 209 are used to serve each sector to provide various advanced communication modes (e.g., adaptive beamforming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Base units 201 and 202 transmit downlink communication signals 204 and 205 to serving remote units on at least a portion of the same resources (time, frequency, or both). Remote units 203 and 210 communicate with one or more base units 201 and 202 via uplink communication signals 206 and 213.

It should be noted that while only two base units and two remote units are illustrated in FIG. 2, one of ordinary skill in the art will recognize that typical communication systems comprise many base units in simultaneous communication with many remote units. It should also be noted that while the present invention is described primarily for the case of uplink transmission from a mobile unit to a base station, the invention is also applicable to downlink transmissions from base stations to mobile units, or even for transmissions from one base station to another base station, or from one mobile unit to another. A base unit or a remote unit may be referred to more generally as a communication unit.

As discussed above, pilot assisted modulation is commonly used to aid in many functions such as channel estimation for subsequent demodulation of transmitted signals. With this in mind, mobile unit 203 transmits known (pilot) sequences at known time intervals as part of their uplink transmissions. Any base station, knowing the sequence and time interval, utilizes this information in demodulating/decoding the transmissions. Thus, each mobile/remote unit within communication system 200 comprises pilot channel circuitry 207 that transmits one or more pilot sequences along with data channel circuitry 208 transmitting data.

For pilot signal transmission, a TDM pilot approach is attractive for PAPR and for providing orthogonality between the pilot and data streams. However, in some systems it may limit the granularity available for adjusting the pilot overhead. In one embodiment, shorter block duration is used for the pilot block than for the data block in order to provide a finer granularity for the choice of pilot overhead. In other embodiments, the pilot block may have the same duration as a data block, or the pilot block may have a longer duration than a data block.

As a consequence of using a shorter block length for pilot blocks than data blocks, the subcarrier bandwidth and the occupied subcarrier spacing for the pilot block becomes larger than the subcarrier bandwidth and the occupied subcarrier spacing for the data block, assuming the same IFDMA repetition factor (or occupied subcarrier decimation factor) is used for both the pilot block and the data block. In this case, if the pilot block length (excluding cyclic prefix) is Tp and the data block length (excluding cyclic prefix) is Td, the subcarrier bandwidth and the occupied subcarrier spacing for the pilot block is Td/Tp times the subcarrier bandwidth and the occupied subcarrier spacing for the data block, respectively.

Pilot transmissions may occur simultaneously by two or more transmitters, such as mobile unit 203 and mobile unit 210, or by two or more antennas of mobile unit 210. It is advantageous to design the pilot sequences transmitted by different transmitters to be orthogonal or otherwise separable to enable accurate channel estimation by a receiver, such as base unit 201, to each transmitter (note that the role of the base units and mobile units may also be reversed, wherein the base units or antennas of a base unit are transmitters and the mobile unit or units are receivers).

One method of providing separability between the pilots or channel estimates of two or more transmitters is to assign different sets of subcarriers to different transmitters for the pilot transmissions, also referred to as FDMA pilot assignment. The different sets of subcarriers could be interleaved among transmitters or could be on different blocks of subcarriers, and may or may not be confined to a small portion of the channel bandwidth of the system.

Another method of providing separation between the pilots or channel estimates of multiple transmitters is to assign two or more transmitters to a same set of subcarriers for pilot transmission and utilize sequence properties to provide the separation. Note that FDMA pilot assignments and the utilization of sequence properties can both be applied to a system. For example, a first set of transmitters may use a first set of subcarriers, with each transmitter in the set transmitting its pilot signal on possibly all of the subcarriers of the first set of subcarriers. A second set of transmitters may use a second set of subcarriers for pilot transmission, where the second set of subcarriers is orthogonal to the first set of subcarriers (FDMA). Note that the members of a set of subcarriers do not need to be adjacent. Since the transmitters in a set may interfere with each other as they use the same set of subcarriers for pilot signal transmission, the pilot sequences of the transmitters in the same set should have sequence properties that enable the channel response to be estimated to one of the transmitters while suppressing the interference from the other transmitters in the same set. The present disclosure provides a method and apparatus for suppressing such interference.

The present disclosure enables a larger number of transmitters to transmit pilot signals simultaneously while providing for separability of the pilots or channel estimates at a receiver. Multiple transmitters transmit pilots on a first set of subcarriers during a first interval (e.g., a first pilot block), and the multiple transmitters transmit pilots on a second set of subcarriers during a second interval (e.g., a second pilot block). The number of intervals or pilot blocks may also be larger than two. The pilot sequence properties are chosen for the plurality of intervals to provide channel estimate separation over the plurality of intervals, even though the channel estimates may not be separable if only a single interval was considered.

Figure 4:
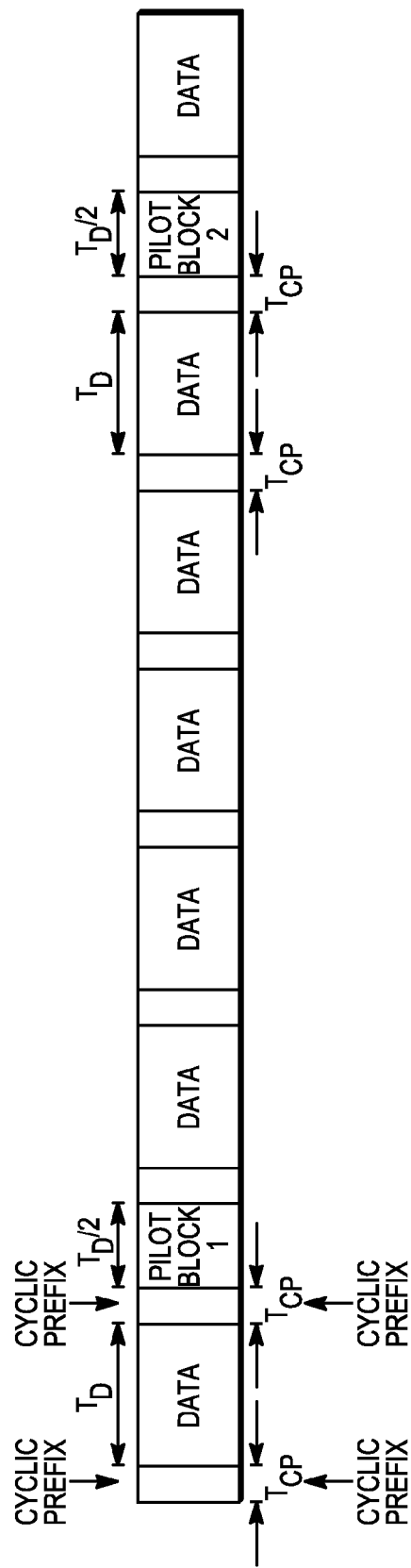
FIG. 4 shows a burst format with pilot blocks and data blocks in accordance with some embodiments of the invention.

A burst format suitable for use with one embodiment is shown in FIG. 4. In FIG. 4, Td is the duration of a data block and the duration of the pilot block is Tp=Td/2. One way to specify the subcarriers assigned to or used by a signal is to specify the block length B, the repetition factor R (or the subcarrier decimation factor or skip factor), and the subcarrier offset index S. The parameters are similar to a B-subcarrier OFDM modulator, with subcarrier mapping of evenly-spaced subcarriers with spacing of R subcarriers with a subcarrier offset of S, for a DFT-SOFDM signal. These can be written as an ordered triplet: (B, R, S). In the example, the data blocks are configured as (Td, Rd, Sd). The first pilot block is configured as (Tp, Rp, Sp1) and the second pilot is configured as (Tp, Rp, Sp2). The cyclic prefix (CP) length is Tcp. Note that the block length, repetition factor, and subcarrier offset can in general be different for pilot blocks and data blocks, or can be changed over time for data blocks or pilot blocks.

Figure 5:
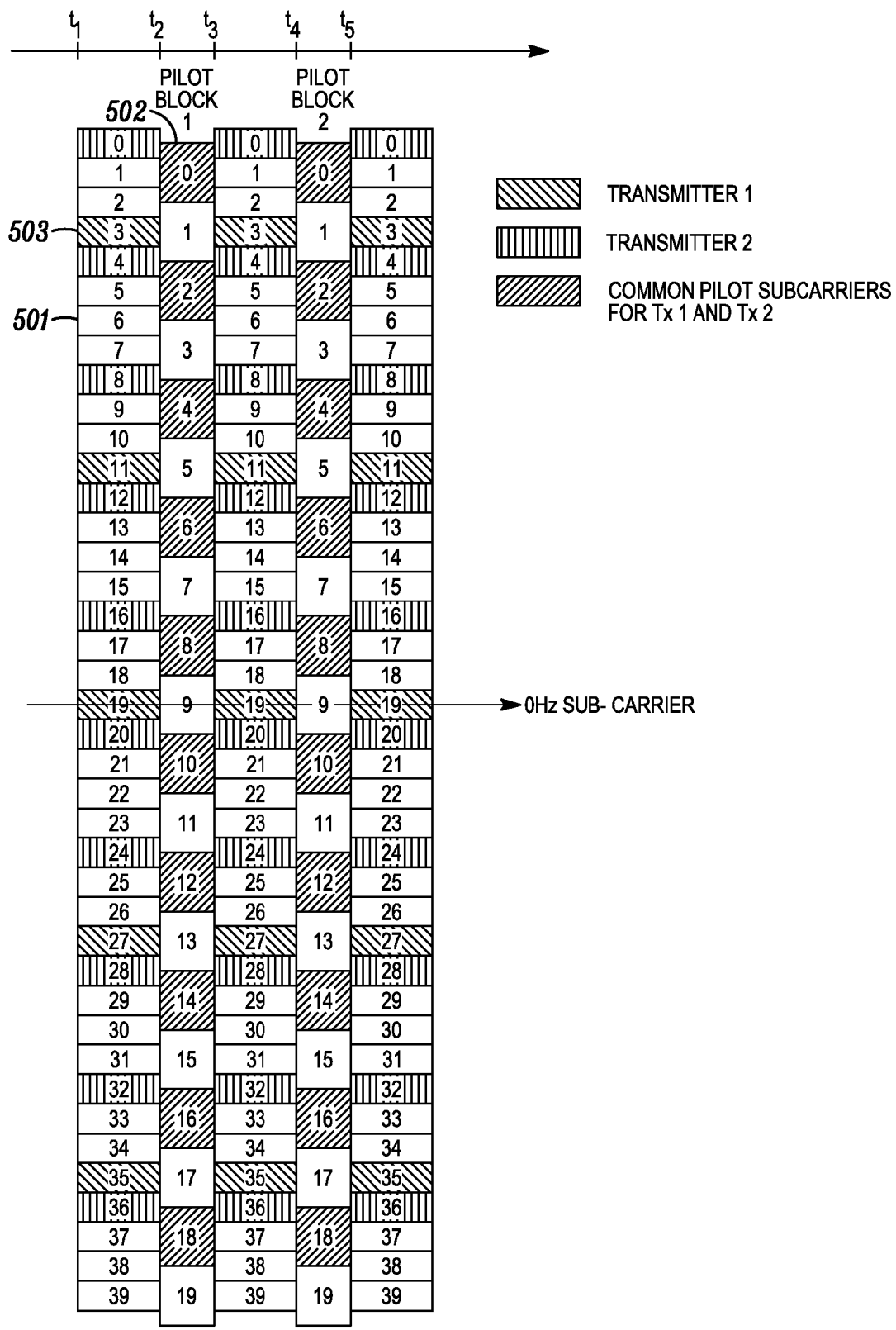
FIG. 5 shows a time-frequency example of transmissions in the burst format of FIG. 4.

While FIG. 4 shows the time domain format of the burst, the frequency domain description over time is shown in FIG. 5. For simplicity, FIG. 5 shows pilot and data transmission for only two transmitters, with the transmissions by each transmitter being shaded. In FIG. 5A, the data blocks of the first transmitter are configured as (Td=40, Rd=8, Sd=3), the data blocks of the second transmitter are configured as (Td=40, Rd=4, Sd=0), the first pilot block (pilot set 1) is configured as (Tp=20, Rp=2, Sp=0) for both transmitters, and the second pilot block (pilot set 2) is configured as (Tp=20, Rp=2, Sp=0) for both transmitters. In FIG. 5B, the data blocks for the first and second transmitters are configured similarly to FIG. 5A, while both the first and second pilot blocks are configured as (Tp=20, Rp=1, Sp=0), thus providing pilot information on directly adjacent subcarriers of the pilot block. As one of ordinary skill in the art will recognize, transmissions by a particular transmitter (e.g., transmitter 1 in FIG. 5) will occupy several subcarriers, as indicated by the shaded subcarriers 503 (only one labeled) out of all the subcarriers 501 (only one labeled). FIG. 5 is illustrated having total possible data block subcarriers 0 through 39. Note that the data block configuration (Td, Rd, Sd) for a transmitter could be different on different data blocks within the burst. Also, the pilot block configuration could be different on different pilot blocks in the burst. While the example given in FIG. 5 is for IFDMA of the data transmissions from different transmitters, note that LFDMA can also be represented by setting Rd=1, Td<=40, and by choosing Sd as the first occupied subcarrier of the transmitter's data transmission.

Because the pilot channel block duration is less than the data channel block duration in the burst format of FIG. 4, each pilot subcarrier 502 (only one labeled) takes up more bandwidth than does a data subcarrier. For example, in FIG. 5, a pilot subcarrier takes up twice as much bandwidth as a data subcarrier. Thus, fewer pilot subcarriers can be transmitted within the available bandwidth than can data subcarriers. FIG. 5 is illustrated having the total possible pilot subcarriers 0 through 19, with both transmitters occupying the shaded pilot subcarriers (the remaining unshaded data and pilot subcarriers can be utilized by other transmitters).

In one embodiment, cyclic time shifts of one or more pilot sequences are transmitted by mobile unit 203 and mobile unit 210 in the first pilot block and in the second pilot block of FIG. 5. A cyclic time shift of a pilot sequence can be implemented, for example, by moving a block of time domain samples of the pilot block from the end of the pilot block to the beginning of the pilot block. Then the cyclic prefix of the pilot block is based on the samples of the pilot block after the cyclic shift has been applied. The number of samples that are moved from the end of the block to the beginning of the block is the amount of the cyclic shift in the block. For the purpose of illustration, if there are six time domain samples in a particular pilot block and they are, in time order from first to last, x(1), x(2), x(3), x(4), x(5), x(6), then a cyclic time shift of three samples would result in a pilot block with the samples, in time order from first to last, of x(4), x(5), x(6), x(1), x(2), x(3). And if the cyclic prefix for the pilot block was two samples, the cyclic prefix samples of the cyclically shifted pilot block would be, from first to last, x(2), x(3). As described herein, additional methods for providing a cyclic time shift are equivalent to the one described above.

When multiple transmitters are transmitting pilot blocks simultaneously on the same set of subcarriers, different transmitters can use different cyclic time shifts of the same pilot sequence to enable a receiver to estimate the channel between the receiver and each of the transmitters. For the purpose of illustration, assume that the first transmitter is using a first pilot sequence that has constant magnitude, when viewed in the frequency domain, on the subcarriers used by the pilot block. Also assume the pilot block length is Tp and that the cyclic prefix length is Tcp. If the channel impulse response duration is less than Tcp and the pilot block has Rp=1 (as shown in FIG. 5B), then it can be shown that up to Tp/Tcp different transmitters can transmit in the same pilot block, with different cyclic shift values, and the channel estimates will be separable (or nearly orthogonal) at the receiver. For example, if Tp/Tcp=4 and there are 4 transmitters, then a first transmitter can use a cyclic time shift of 0, a second transmitter can use a cyclic time shift of Tp/4, a third transmitter can use a cyclic time shift of Tp/2, and a fourth transmitter can use a cyclic time shift of 3Tp/4. In equation form, a frequency-domain representation of a pilot sequence for the $l^{th}$ transmitter on subcarrier k and block b for the case of Rp=1 can be represented as: $x_l(k,b)=s(k,b)e^{-j2\pi k\alpha_l/P}$ where s(k,b) is the baseline or un-shifted pilot sequence (e.g., a constant modulus signal such as QPSK, a CAZAC sequence, a GCL sequence, or the DFT/IDFT of a CAZAC or GCL sequence), $\alpha_l$ is the cyclic time shift for transmitter l (for the example above $\alpha_1=0$, $\alpha_2=Tp/4$, $\alpha_3=Tp/2$, and $\alpha_4=3Tp/4$), and P is a cyclic shift factor (P=Tp in the above example). Note that the pilot sequence can be implemented in the time domain by performing a circular shift of S(n,b) which is the IFFT of s(k,b) (for the above example, transmitter 1 would send an unshifted version of S(n,b), transmitter 2 would send S(n,b) circularly shifted by Tp/4 samples, transmitter 3 would send S(n,b) circularly shifted by Tp/2 samples, and transmitter 4 would send S(n,b) circularly shifted by 3Tp/4 samples).

Note also that the equation representation of the frequency-domain pilot sequence given above is easily extended to the case where Rp≠1. In this case the pilot sequence is only defined on certain subcarriers and the subcarrier offset, S, must be added to the pilot sequence equation as follows (note that in the next equation $T_p$=Tp and $R_p$=Rp): $x_l(S+R_pf,b)=s(S+R_pf,b)e^{-j2\pi f\alpha_l/P}$ for f=0, 1, . . . , $T_p/R_p-1$. Note that the values of $\alpha_l$ and P may need to change based on the value of Rp. Also note that all subsequent equation representations of the pilot sequence will be given for Rp=1 but can be extended to Rp≠1 in a similar manner to what was just presented.

Figure 6:
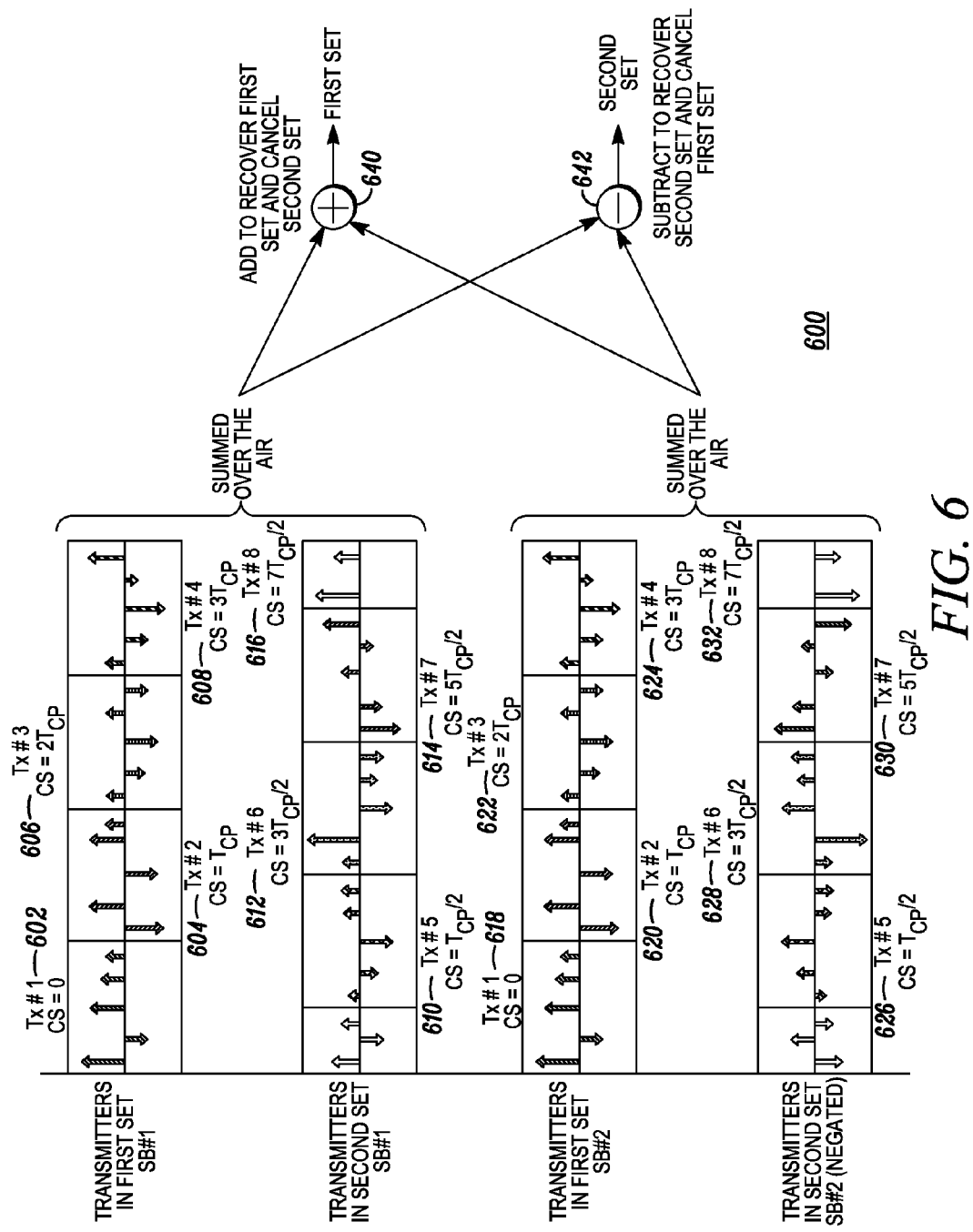
FIG. 6 illustrates the channel responses of multiple transmitters with different cyclic time shifts of their pilot transmission in accordance with some embodiments of the invention.

At the receiver, when the receiver correlates the original pilot sequence with the composite received pilot block from the four transmitters, the channel response to the first transmitter will be in a first block of Tp/4 correlator output samples, as shown in FIG. 6 at 602, the channel response to the second transmitter will be in the next block of Tp/4 correlator output samples, as shown in FIG. 6 at 604, and so forth, as shown in FIG. 6 at 606 and 608. Note that the correlator-based channel estimator is only used as an example and other channel estimation techniques known in the art might be used such as DFT-based channel estimator and MMSE-based channel estimators.

Note that in this example, the time shift increment of Tp/4 was chosen to be the same as the cyclic prefix (CP) duration (Tcp=Tp/4). It is often advantageous to make the time shift increment similar to the CP length if the pilot block has Rp=1 because the CP is normally chosen to be as large as the maximum expected multipath channel delay spread in the system 200 of FIG. 2. However, if Tcp is shorter than the expected duration of the channel, then the number of transmitters that can be separated at the receiver is Tp/L where L is the expected maximum length of the channel. In this case the time shift increment could be larger than the CP length and could be tied to the expected maximum channel length, L. When the time shift increment is at least as large as the multipath delay spread of the channel, then the channel responses for each transmitter will be confined to its respective correlator output block of length Tcp (note that practical issues such as conventional signal conditioning and filtering, sampling granularity, and so on will generally cause a small amount of leakage between the estimates of the channel response in one correlator output block and another, but in most cases of interest this leakage can be considered small and be ignored for the purpose of describing the invention). However, if the time delay increment between transmitters is less than the channel response duration, a portion of the channel response of one transmitter will appear in the channel response of another transmitter and will interfere with the channel estimate of the other transmitter. As a result, in this example, if the channel response is no larger than the CP length and the time shift increment between transmitters equal to the CP length (with Tcp=Tp/4), a total of four transmitters can be supported while providing separable channel estimates to each transmitter.

In order to increase the number of transmitters that can be supported with separable channel estimates, the present invention provides a method for assigning pilot sequences to a plurality of transmitters over a plurality of pilot blocks, such that when processed over the plurality of pilot blocks at a receiver, the channel estimates become separable. In FIG. 6, one embodiment provides a doubling of the number of transmitters that can be supported with separable channel estimates is illustrated. In one pilot block (denoted as SB#1 in FIG. 6), some of the transmitters in FIG. 6 are assigned cyclic shifts that are integer multiples of Tcp (multiples of 0, 1, 2, 3) and others are assigned cyclic shifts that are odd multiples of Tcp/2 (multiples 1, 3, 5, 7). For example, a first transmitter denoted as Tx#1 uses a first cyclic time shift value of zero, and the time domain channel response for this transmitter is illustrated by the five arrows or rays within the time region from 0 to Tcp in the region 602 associated with transmitter Tx#1. A second transmitter, denoted as Tx#5 in FIG. 6, uses a second cyclic time shift value of Tcp/2. As a result, when the channel response length for transmitter Tx#1 is greater than Tcp/2, the channel response for transmitter Tx#1 will interfere with the channel response for transmitter Tx#5 in the region between Tcp/2 and Tcp, and vice versa, and the channel estimates are no longer separable without significant interference. In equation form, a frequency-domain pilot sequence for the $l^{th}$ transmitter on subcarrier k and block $b_1$ (which is the location of this first pilot block) for the case of Rp=1 can be represented as: $x_l(k,b_1)=s(k,b_1)e^{-j2\pi k\alpha_l/P}$ where $s(k,b_1)$ is a pilot sequence for the first pilot block (e.g., a constant modulus signal such as QPSK, a CAZAC sequence, a GCL sequence, or the DFT/IDFT of a CAZAC or GCL sequence), $\alpha_l$ is the cyclic time shift for transmitter l (for the example above $\alpha_1$=0, $\alpha_2$=Tcp, $\alpha_3$=2Tcp, $\alpha_4$=3Tcp, $\alpha_5$=Tcp/2, $\alpha_6$=3Tcp/2, $\alpha_7$=5Tcp/2, $\alpha_8$=7Tcp/2), and P is a cyclic shift factor (P=4Tcp in the above example). Note that as in the previous equation that these shifts can be applied in the time domain by circularly shifting the IFFT of $s(k,b_1)$, $S(n,b_1)$, by the appropriate amounts.

In order to provide separation with the larger number of transmitters, a second pilot block is transmitted by the transmitters. The channel responses associated with the transmitters for the second pilot block are illustrated in the lower half of FIG. 6 (SB#2). The pilot sequences of the transmitters are assigned in a way that allows the interference between the first transmitter and the second transmitter to be suppressed by combining the channel estimates from the first and second pilot blocks. In one embodiment, cyclic time shifts of a common pilot sequence are used in both the first and second pilot blocks, but the sign of the common pilot sequence is inverted in one of the pilot blocks for one or more transmitters. FIG. 6 shows an embodiment where the sign of the pilot sequence is inverted during the second pilot block for transmitters using cyclic shifts that are odd multiples of Tcp/2. In equation form for this embodiment, a frequency domain representation of the pilot sequence for the $l^{th}$ transmitter on subcarrier k and block $b_2$ (which is the location of this second pilot block) for the case of Rp=1 is given as:

$$x_l(k, b_2) = \begin{cases} s(k, b_2)e^{-j2\pi k\alpha_l/P} & \text{for } 1 \le l \le 4 \\ -s(k, b_2)e^{-j2\pi k\alpha_l/P} & \text{for } 5 \le l \le 8 \end{cases}$$

where $s(k,b_2)$ is a baseline or un-shifted pilot sequence for the second pilot block (e.g., a constant modulus signal such as QPSK, a CAZAC sequence, a GCL sequence, or the DFT/IDFT of a CAZAC or GCL sequence), $\alpha_l$ is the cyclic time shift for transmitter l (for the example above $\alpha_1$=0, $\alpha_2$=Tcp, $\alpha_3$=2Tcp, $\alpha_4$=3Tcp, $\alpha_5$=Tcp/2, $\alpha_6$=3Tcp/2, $\alpha_7$=5Tcp/2, $\alpha_8$=7Tcp/2), and P is a cyclic shift factor (P=4Tcp in the above example). Note that as in the previous equations that these shifts can be applied in the time domain by circularly shifting the IFFT of $s(k,b_2)$, $S(n,b_2)$, by the appropriate amounts. This allows the interference between transmitters with odd multiples of Tcp/2 and transmitters with integer multiples of Tcp to be suppressed by combining over the received pilot blocks. Thus, the interference from transmitter Tx#5 on the channel estimate for Tx#1 can be suppressed adding the first received pilot block to the second received pilot block prior to performing channel estimation. Alternatively, a channel estimate derived for Tx#1 from the first pilot block can be added to a channel estimate derived for Tx#1 from the second pilot block to suppress the interference from Tx#5. Likewise, the interference from Tx#1 on Tx#8 can be suppressed by subtracting the second received pilot block from the first received pilot block prior to channel estimation, or the channel estimate obtained for Tx#8 in the second pilot block can be subtracted from the channel estimate obtained for Tx#8 in the first pilot block (this assumes that an inverted channel estimate is obtained for Tx#8 in the second pilot block by correlating with non-inverted common pilot sequence—however, if the inverted sequence is correlated with the second pilot block, then a non-inverted channel estimate would be obtained for Tx#8 and the estimates for Tx#8 from the first pilot block and the second pilot block would be added instead of subtracted).

Note that in the above description it was assumed that the second pilot block contained the negation. If the negation were to be applied to the first pilot block and no negation applied to the second pilot block, then similar processing to that described above could be used but with the roles of the first and second pilot blocks being reversed.

In another embodiment, cyclic time shifts of a first common pilot sequence are assigned to the transmitters for the first pilot block and cyclic shifts of a second, different, common pilot sequence, that is also inverted for some transmitters (as in the previous embodiment), is assigned to the transmitters for the second pilot block. This embodiment may provide improved averaging over other-cell interference. In this embodiment, the channel estimates for the first pilot block can be obtained by correlating the first received pilot block with the first common sequence, and the channel estimates for the second pilot block can be obtained by correlating the second received pilot block with the second common sequence. The channel estimates for the first and second pilot blocks can be combined (e.g., added or subtracted, as appropriate) to suppress the corresponding interference. In equation form for this embodiment, a frequency domain representation of the pilot sequence for the $l^{th}$ transmitter on subcarrier k and symbol $b_m$ (which is the location of the $m^{th}$ pilot block) can be represented as (for Rp=1): $x_l(k,b_m)=s_m(k,b_m) e^{-j2\pi k\alpha_l(b_m)/P(b_m)}$ where $s_m(k,b_m)$ is a baseline or un-shifted pilot sequence for the $m^{th}$ pilot block (e.g., a constant modulus signal), $\alpha_l(b_m)$ is the cyclic time shift for transmitter l for pilot block m, and $P(b_m)$ is a cyclic shift factor for pilot block m. Note that the cyclic shift could also be implemented in the time domain by circularly shifting the time-domain pilot signal by the appropriate amount.

In another embodiment, one set of transmitters is assigned cyclic shifts of a first common pilot sequence for both the first and second pilot blocks, and a second set of transmitters is assigned cyclic shifts of a second common pilot sequence for both the first and second pilot blocks, but the second common sequence is inverted in the second pilot block relative to the second common sequence in the first pilot block so that the received pilot blocks can be processed to suppress the interference between transmitters assigned the same cyclic time shift value. In equation form for this embodiment, a frequency-domain representation of the pilot sequence for the $l^{th}$ transmitter on subcarrier k and symbol $b_m$ (which is the location of the $m^{th}$ pilot block, m=0, 1) can be represented as (for Rp=1):

$$x_l(k, b_m) = \begin{cases} s(k, b_m)e^{-j2\pi k\alpha_l/P} & \text{for } l \in L_1 \\ (-1)^{m-1}z(k, b_m)e^{-j2\pi k\alpha_l/P} & \text{for } l \in L_2 \end{cases}$$

where $L_1$ is the first set of transmitters, $L_2$ is the second set of transmitters, $s(k,b_m)$ is a baseline or un-shifted pilot sequence for the first set of transmitters on pilot block m (e.g., a constant modulus signal), $z(k,b_m)$ is a baseline or un-shifted pilot sequence for the second set of transmitters on pilot block m (e.g., a constant modulus signal), $\alpha_l$ is the cyclic time shift for transmitter l, and P is a cyclic shift factor.

In another embodiment, the cyclic time shift assigned to one transmitter can be the same as the cyclic time shift assigned to another transmitter (e.g., with 8 transmitters, two could be assigned a cyclic shift of 0, another two can be assigned a cyclic shift of Tcp, and so on). In this embodiment, cyclic time shifts of a common pilot sequence can be used by the transmitters in both the first and second pilot blocks, but the sign of the common pilot sequence is inverted in one of the pilot blocks for one set of transmitters so that the received pilot blocks can be processed to suppress the interference between transmitters assigned the same cyclic time shift value. In another embodiment where the same cyclic time shift is assigned to multiple transmitters, one set of transmitters, each with a different cyclic shift value, is assigned a first pilot sequence, and a second set of transmitters, each with a different cyclic shift value, is assigned a second pilot sequence. The transmitters in the second set invert the second pilot sequence in one of the pilot blocks so that the received pilot blocks can be processed to suppress the interference between transmitters assigned the same cyclic time shift value.

For convenience, the embodiments above have been described for the case where the pilot block has Rp=1 (e.g., FIG. 5B). In embodiments where the pilot block transmission of a transmitter occupies a decimated set of subcarriers, such as an Rp=2 in FIG. 5A, the number of separable channel responses is reduced. The number of separable channel responses becomes (1/Rp) times the number of separable channel responses that were possible with Rp=1. For example, if FIG. 6 is for the case of Rp=1 on a pilot block, then for an embodiment similar to FIG. 6 but with Rp=2, there could be two transmitters in the first set, with cyclic shifts of 0 and Tcp respectively, and there could be two other transmitters in the second set, with cyclic shifts of Tcp/2 and 3Tcp/2 respectively.

For convenience, the embodiments of the disclosure are described for the case where there are two pilot blocks over which the channel response separation is obtained. However, the disclosure is also applicable when the number of pilot blocks is greater than two. For example, one embodiment with four pilot blocks would provide for twice as many separable channel responses as an embodiment with two pilot blocks. Building upon FIG. 6, there may be four sets of transmitters, each set using a possibly different set of cyclic shifts. For example, a third set of transmitters could be assigned cyclic shifts of Tcp/4, 5Tcp/4, 9Tcp/4, or 13Tcp/4, and a fourth set of transmitters could be assigned cyclic shifts of 3Tcp/4, 7Tcp/4, 11Tcp/4, or 15Tcp/4. For embodiments with more than two pilot blocks, the sequence inversion method described earlier is extended to the general case of orthogonal sets of multiplicative factors over the pilot blocks. For example, all transmitters can use cyclic shifts of a common pilot sequence, and the four pilot blocks of the first set of transmitters can be multiplied by a first set of block modulation coefficients such as the elements of a Walsh code or other orthogonal sequence of length four (the samples of the first pilot block are multiplied by the first element of the orthogonal code and so forth). The second set of transmitters would utilize a second orthogonal sequence in a similar fashion, and so forth. The receiver would combine weighted channel estimates from the four pilot blocks with the weighting coefficients based on the orthogonal sequences to recover certain channel estimates while suppressing others. (Note that in FIG. 6, the block modulation coefficients are (1,1) for transmitters in the first set and (1,−1) for the transmitters in the second set). The weighting coefficients can be based on the block modulation coefficients (such as the conjugates of the block modulation coefficients) or be adapted based on channel conditions to provide a compromise between tracking any variation of the channel response over the burst and suppression of the interfering pilot signals from other transmitters. In one embodiment, the weighting coefficients are based on the block modulation coefficients and the Doppler frequency or expected channel variation over the burst thereby providing a tradeoff between channel tracking and interference suppression. The weighting coefficients may also be different for different positions (e.g., different data block positions) in the burst by selecting or determining a set of weighting coefficients to be used for processing the received pilot blocks at each position in the burst. The weighting coefficients can be based on minimum mean square error (MMSE) criteria. The processing may comprise filtering/interpolation based on the weighting coefficients. In cases where Rp is 2 or larger, the processing can be two-dimensional (frequency and time), or can be performed separately over frequency and then time, or for some channels with limited variation over the burst duration the two received pilot blocks can be treated as being received at the same time and a frequency interpolation/filtering can be performed on the composite of the occupied pilot subcarriers from the two received pilot blocks. In cases where the delay spread is less than the minimum increment between cyclic shifts (cyclic delays), the processing can be adapted to provide improved performance. In this case, the interference between transmitters will be suppressed within each pilot individually, so the processing can select or determine the weighting coefficients based on the expected amount of channel variation and noise instead of determining or selecting weights that are designed to suppress pilot interference over the multiple pilot blocks.

Figure 7:
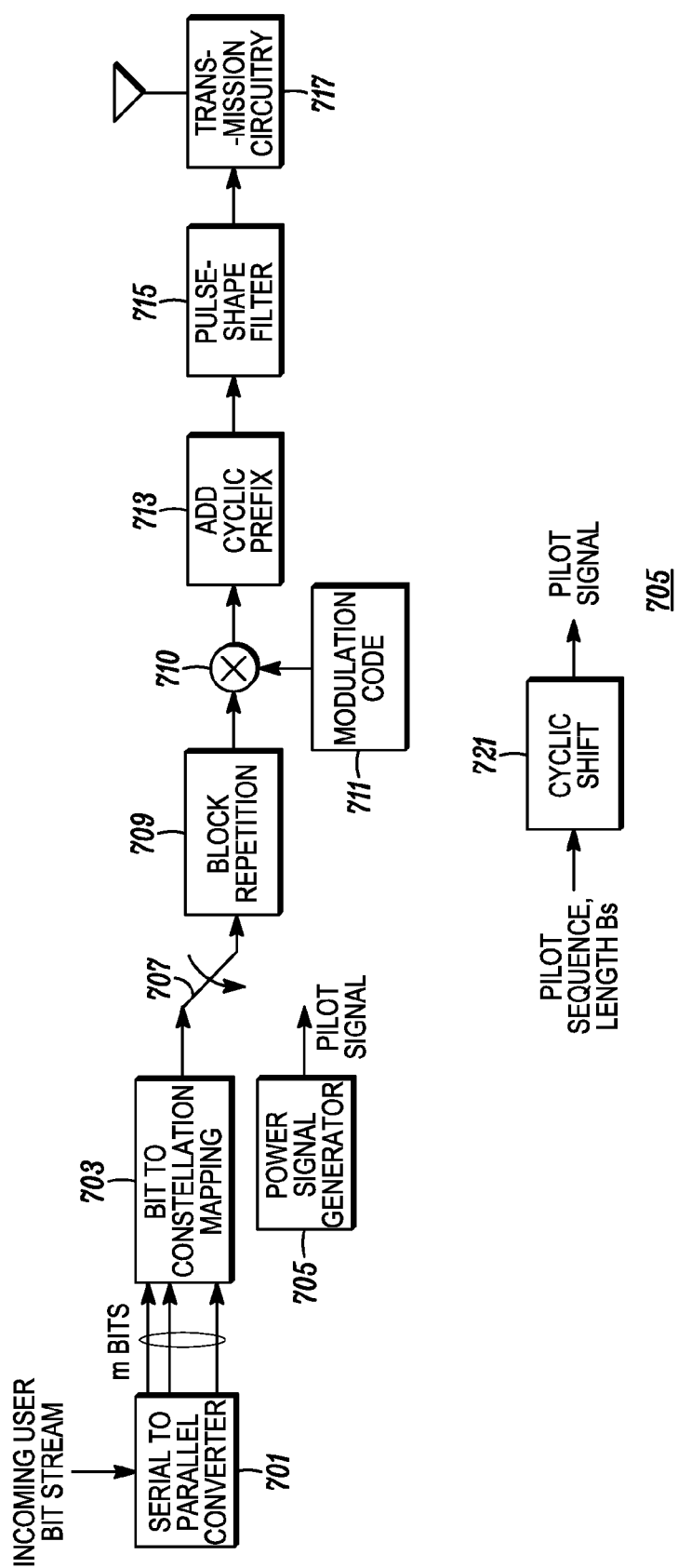
FIG. 7 is a block diagram of an IFDMA transmitter in accordance with some embodiments of the invention.

FIG. 7 is a block diagram of an IFDMA transmitter 700 performing time-domain signal generation. During operation, incoming data bits are received by serial to parallel converter 701 and output as m bit streams to constellation mapping circuitry 703. Switch 707 serves to receive either a pilot signal (sub-block) from pilot signal generator 705, or a data signal (sub-block) from mapping circuitry 703 of sub-block length, Bs. The length of the pilot sub-block may be smaller or larger than that of the data sub-block. As shown in FIG. 7B, pilot signal generator 705 may provide a cyclic time shift of a pilot sequence for the pilot sub-block. Regardless of whether pilot sub-block or data sub-block are received by sub-block repetition circuitry 709, circuitry 709 serves to perform sub-block repetition with repetition factor Rd on the sub-block passed from switch 707 to form a data block of block length B. Note that Rd=1 can also be used when the signal is to occupy a contiguous set of subcarriers thus providing a single-carrier signal. Block length B is the product of the sub-block length Bs and repetition factor Rd and may be different for pilot and data blocks, as was shown in FIG. 4. The sub-block length Bs and repetition factor Rd may be different for the data and pilot. Data block and a modulation code 711 are fed to modulator 710. Thus, modulator 710 receives a symbol stream (i.e., elements of data block) and an IFDMA modulation code (sometimes referred to as simply a modulation code). The output of modulator 710 comprises a signal existing at certain evenly-spaced frequencies, or subcarriers, the subcarriers having a specific bandwidth. The actual subcarriers that signal utilizes is dependent upon the repetition factor Rd of the sub-blocks and the particular modulation code utilized. The sub-block length Bs, repetition factor Rd, and modulation code can also be changed over time. Changing the modulation code changes the set of subcarriers, so changing the modulation code is equivalent to changing Sd. Varying the block length B varies the specific bandwidth of each subcarrier with larger block lengths having smaller subcarrier bandwidths. It should be noted, however, that while changing the modulation code will change the subcarriers utilized for transmission, the evenly-spaced nature of the subcarriers remain. Thus, subcarrier changing pilot pattern is achieved by changing the modulation code. In one embodiment the modulation code is changed at least once per burst. In another embodiment, the modulation code is not changed in a burst. A cyclic prefix is added by circuitry 713 and pulse-shaping takes place via pulse-shaping circuitry 715. The resulting signal is transmitted via transmission circuitry 717.

Transmitter 700 is operated so that transmission circuitry 717 transmits a plurality of data symbols over a first plurality of subcarriers, wherein each subcarrier within the first plurality of subcarriers has a first bandwidth. One example of this is the like shaded subcarriers between t1 and t2 in FIG. 5, the like shaded subcarriers between t3 and t4, and the shaded subcarriers beginning at t5. Transmission circuitry 717 transmits a first pilot sequence at a first time for a user, wherein the first pilot sequence is transmitted in a first pattern over a second plurality of subcarriers. Each subcarrier from the second plurality of subcarriers has a second bandwidth. One example of this with the second bandwidth being different than the first bandwidth is the shaded subcarriers in the column Pilot Block 1 of FIG. 5 (between t2 and t3). The second pilot sequence is transmitted for the user at a second time. The second pilot sequence is transmitted in a second pattern over a third plurality of subcarriers, each subcarrier from the third plurality of subcarriers having a third bandwidth. One example of this with the third bandwidth being the same as the second bandwidth is the shaded subcarriers in the column Pilot Block 2 of FIG. 5 (between t4 and t5). Note that although the cyclic shift of the pilot sequence is shown to take place at the pilot signal generator 705, in other embodiments the cyclic shift of the pilot block could be implemented in other places. For example, a cyclic time shift can be applied to the pilot block samples between application of the modulation code (710) and the addition of the cyclic prefix (713).

FIG. 8 is a block diagram of a transmitter 800 (which will be designated as transmitter 1 in the following equations) used to transmit pilots and data in the frequency domain using a DFT-SOFDM transmitter. Blocks 801, 802, and 806-809 are very similar to a conventional OFDM/OFDMA transmitter, while blocks 803 and 805 are unique to DFT-SOFDM. As with conventional OFDM, the IDFT size (or number of points, N) is typically larger than the maximum number of allowed non-zero inputs. More specifically, some inputs corresponding to frequencies beyond the edges of the channel bandwidth are set to zero, thus providing an oversampling function to simplify the implementation of the subsequent transmission circuitry, as is known in the art. As described earlier, different subcarrier bandwidths may be used on pilot blocks than on data blocks, corresponding to different pilot block and data block lengths. In the transmitter of FIG. 8, different subcarrier bandwidths can be provided by different IDFT sizes (N) for pilot blocks and data blocks. For example, a data block may have N=512 and the number of usable subcarriers within the channel bandwidth may be B=384. Then, an example of a pilot block having a larger subcarrier bandwidth (and more specifically, a subcarrier bandwidth twice as large as a data block) is obtained by using N=512/2=256 for the pilot block, with the number of usable pilot subcarriers then being B=384/2=192. Note that the example in FIG. 5 has a number of usable data subcarriers of 40, and a number of usable pilot subcarriers of 20. The specific set of subcarriers out of the usable ones that are occupied by a data block or a pilot block are determined by the mapping block 805.

Figure 8A:
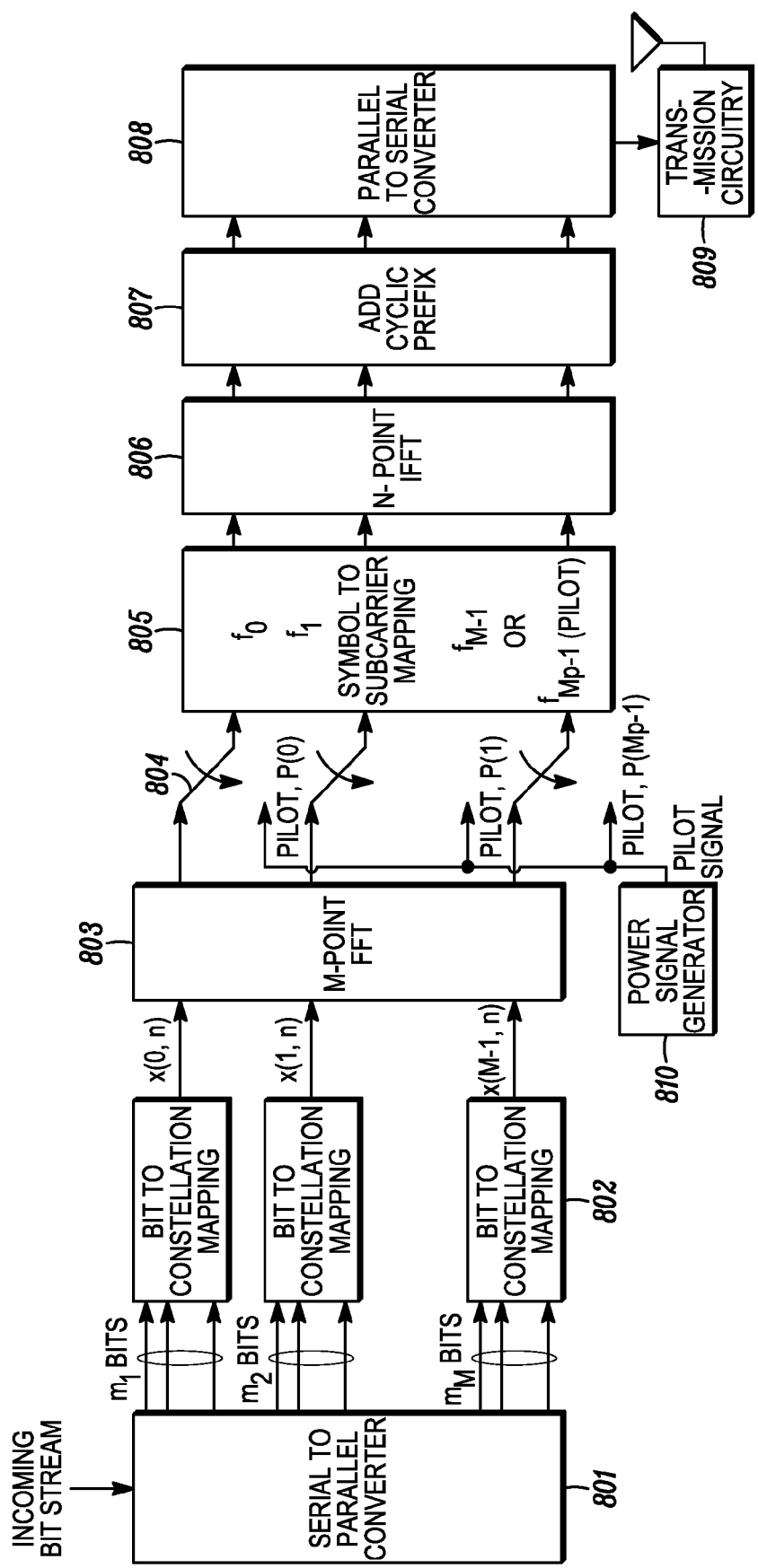
FIG. 8 is a block diagram of a DFT-SOFDM transmitter in accordance with some embodiments of the invention.
Figure 8B:
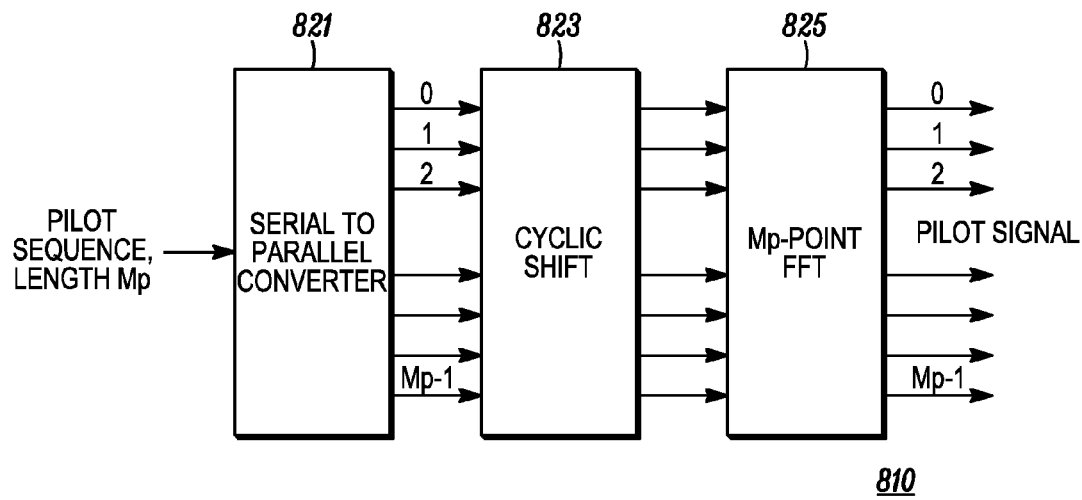
Figure 8C:
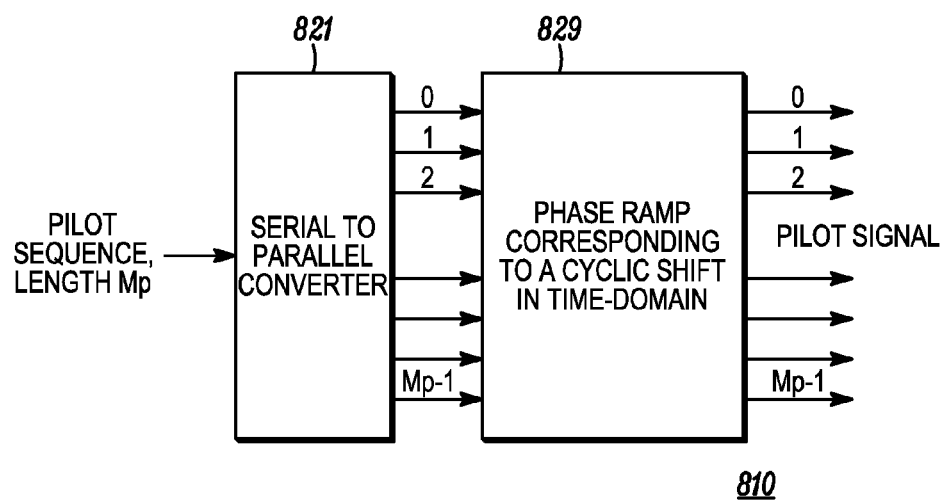

In the pilot signal generator block 810 the frequency-domain pilot symbols are generated and are fed to the symbol to subcarrier mapping block 805. As mentioned above, in one embodiment the frequency-domain pilot symbols for transmitter l are given as (for Rp=1 and $0 \leq k \leq Mp-1$ and b denotes the symbol where the pilot symbols are located): $x_l(k,b)=s(k,b)e^{-j2\pi k\alpha_l/P}$ where s(k,b) is a baseline or un-shifted pilot sequence (e.g., a constant modulus signal such as QPSK a CAZAC sequence, a GCL sequence, or the DFT/IDFT of a CAZAC or GCL sequence), $\alpha_l$ is the cyclic time shift for transmitter l and P is a cyclic shift factor. As mentioned above the sequence can be generated either in the time or frequency domains. More details of the pilot signal generator 810 for time-domain generation of the pilot symbols are illustrated in FIG. 8B. As can be seen, the time-domain pilot sequence of length Mp, S(n,b) is first converted from serial to parallel 821 and then a circular cyclic shift is applied 810 (i.e., the values are circularly shifted by $\alpha_l$ samples if P=Mp). Then in 825 a Mp-point FFT is applied to give the frequency-domain pilot symbols $x_l(k,b)$. As an alternative to time-domain generation of the pilot symbols, the pilot symbols can be generated directly in the frequency domain as shown in FIG. 8C. In this case the frequency-domain pilot sequence, s(k,b) is fed into the serial to parallel converter 821 and then a phase ramp is applied 829 which corresponds to the appropriate time shift and is given by the multiplication by the exponential term in the preceding equation.

A cyclic prefix is added by circuitry 807 followed by a parallel to serial converter 808. Also, although not shown, additional spectral shaping can be performed on the DFT-SOFDM signal to reduce its spectral occupancy or reduce its peak-to average ratio. This additional spectral shaping is conveniently implemented by additional processing before IDFT 806 and may for example be based on weighting or overlap-add processing. Finally the signal is sent over the RF channel through use of transmission circuitry 809.

Figure 8D:
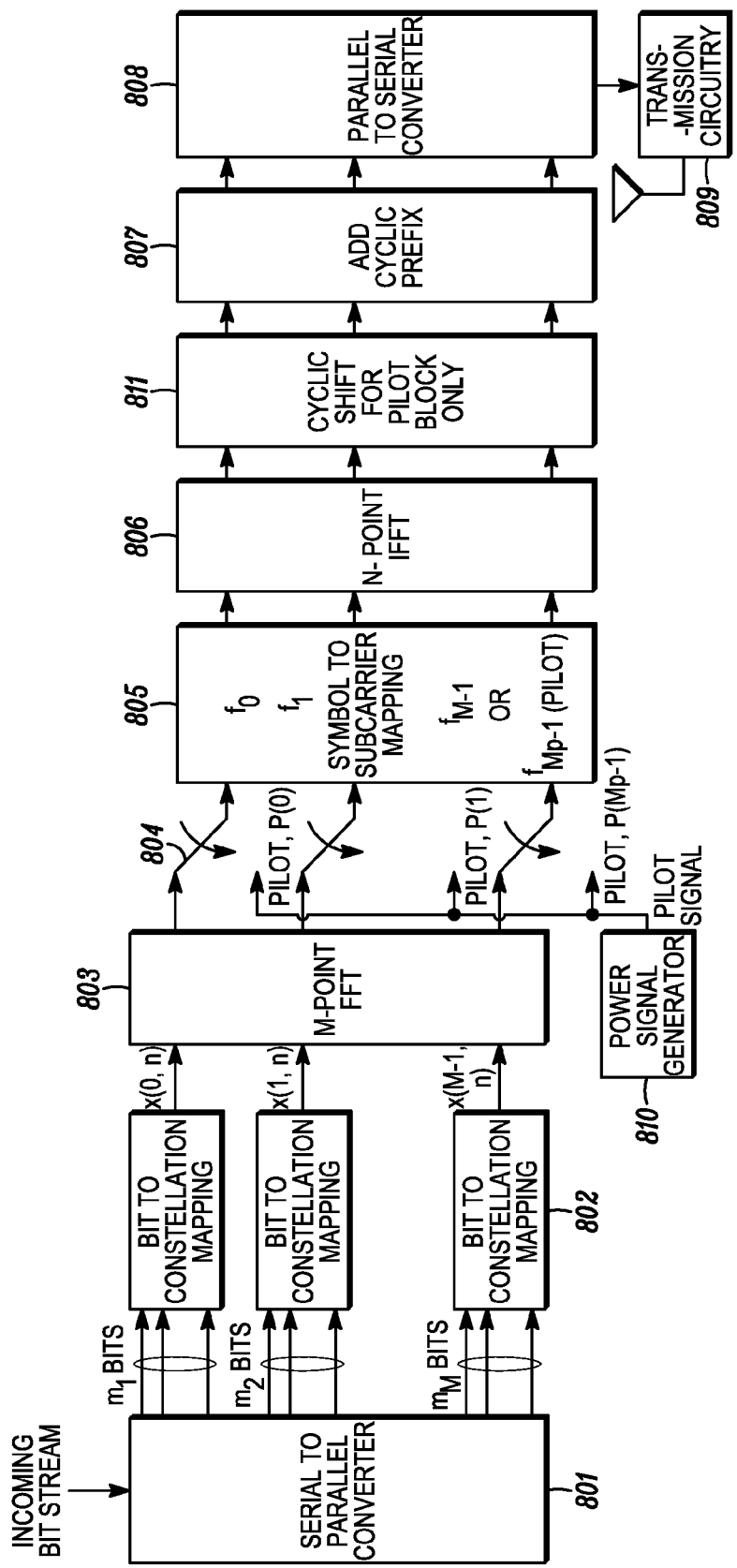
Figure 8E:
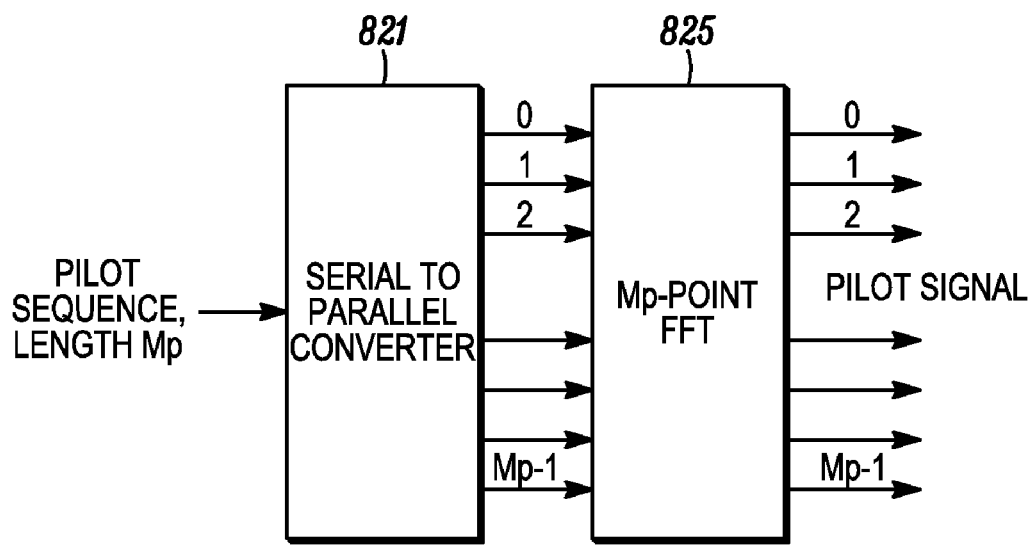
Figure 8F:
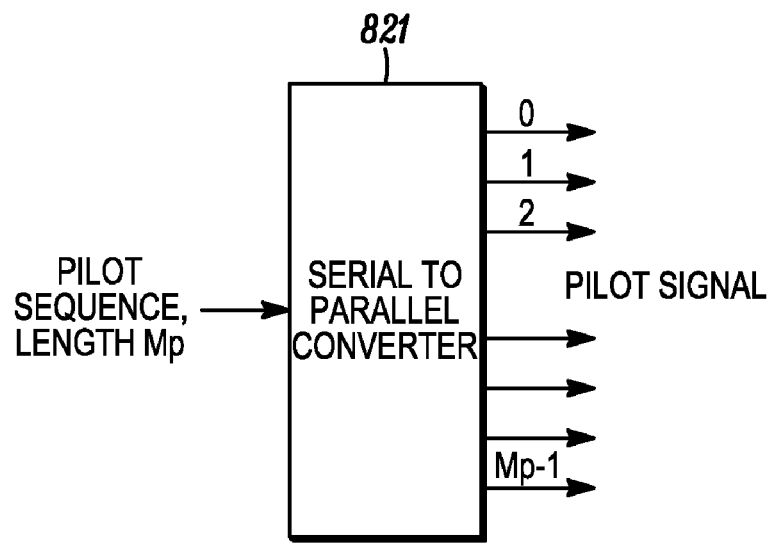

In FIG. 8D, a time-domain implementation of a DFT-SOFDM transmitter (denoted as transmitter l in the following equations) is given where the cyclic shift for the pilot block only is applied in the time domain. This embodiment may have implementation advantages since a time-domain cyclic shift is low complexity and thus the multiplication by a phase ramp (i.e., the exponential term in the pilot symbol equations or block 829 in FIG. 8C) is avoided as is the Mp-point IFFT (block 825 in FIG. 8B). Note the cyclic shift in 811 is not applied to data blocks. Only the blocks that are not common to FIG. 8A are now explained. The time-domain pilot symbol generation 810 is described in FIG. 8E. In this embodiment of the pilot signal generator 810, the time-domain pilot sequence, S(n,b), goes through a serial to parallel converter 821 and then an Mp-point FFT is taken to generate the frequency-domain pilot symbols. An alternative to the time-domain pilot signal generator 810 for the transmitter in FIG. 8D is the frequency-domain pilot signal generator given in FIG. 8F. In this embodiment, the frequency-domain pilot sequence, s(k,b) is only serial to parallel converted 821 to generate the pilot symbols. In both embodiments of the pilot signal generator, the cyclic shift for the pilot blocks is generated by performing a circular time shift 811. In one embodiment assume that the desired frequency-domain pilot sequence is given as (for Rp=1 and $0 \leq k \leq Mp-1$ and b denotes the symbol where the pilot symbols are located): $x_l(k,b)=s(k,b)e^{-j2\pi k\alpha_l/P}$ where s(k,b) is a baseline or un-shifted frequency-domain pilot sequence (e.g., a constant modulus signal such as QPSK, a CAZAC sequence, a GCL sequence, or the DFT/IDFT of a CAZAC or GCL sequence), $\alpha_l$ is the cyclic time shift for transmitter l and P is a cyclic shift factor.

Then the time-domain shift of $\alpha_l$ samples would be applied to the time-domain samples received by block 811 (assuming P=Mp).

In one embodiment, a transmitter (e.g., as shown in FIG. 7 and FIG. 8) receives a resource allocation message and determines pilot configuration information based on the received resource allocation message. The pilot configuration information may comprise cyclic time shift information for a first pilot block and a second pilot block, block modulation coefficient information for the pilot blocks, and possibly information specifying the baseline or un-shifted pilot sequence. There are various ways the pilot configuration information can be provided based on the resource allocation message. For example, the pilot configuration information can be expressly specified in the message, or the pilot configuration information may be implicitly specified based on other information in the resource allocation message and predetermined mapping rules. An example of implicit specification is that the message specifies the resources to be used for data transmission (e.g., (Td, Rd, Sd) and a center frequency) by a transmitter and there is a predetermined mapping between each possible data resource allocation and the pilot configuration information. Note that the pilot configuration information could also be specified with a combination of direct and implicit information from the resource allocation message.

Figure 9:
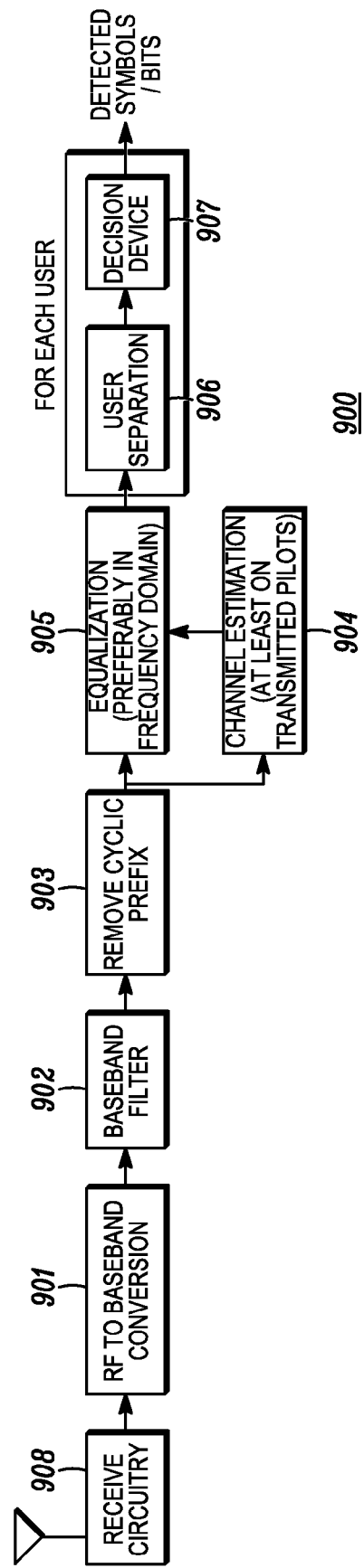
FIG. 9 is a block diagram of a receiver in accordance with some embodiments of the invention.

FIG. 9 is a block diagram of a receiver 900. The received signal is a composite of the channel distorted transmit signal from all the transmitters. During operation the received signal is converted to baseband by baseband conversion circuitry 901 and baseband filtered via filter 902. Once pilot and data information are received, the cyclic prefix is removed from the pilot and data blocks and the blocks are passed to channel estimation circuitry 904 and equalization circuitry 905. As discussed above, a pilot signal is commonly used for communication systems to enable a receiver to perform a number of critical functions, including but not limited to, the acquisition and tracking of timing and frequency synchronization, the estimation and tracking of desired channels for subsequent demodulation and decoding of the information data, the estimation and monitoring of the characteristics of other channels for handoff, interference suppression, etc. With this in mind, circuitry 904 performs channel estimation on the occupied subcarriers for the data block utilizing at least received pilot blocks.

As described above, one embodiment of the channel estimator is the correlator given above. Assuming that the frequency-domain pilot sequence for the $l^{th}$ transmitter on subcarrier k and symbol (block) b is given as (for Rp=1): $x_l(k,b)=s(k,b)e^{-j2\pi k\alpha_l/P}$ where s(k,b) is a baseline or un-shifted pilot sequence (e.g., a constant modulus signal such as QPSK, a CAZAC sequence, a GCL sequence, or the DFT/IDFT of a CAZAC or GCL sequence), $\alpha_l$ is the cyclic time shift for transmitter l (for example assume that there are four transmitters and $\alpha_1=0$, $\alpha_2=Tp/4$, $\alpha_3=Tp/2$, and $\alpha_4=3Tp/4$), and P is a cyclic shift factor (for example, P=Tp). The channel estimator 904 correlates the original pilot sequence with the received pilot sequence with the cyclic prefix removed (i.e., the composite received pilot block from the four transmitters in the example) to get the time-domain channel estimates for each transmitter. In the example, the channel response to the first transmitter will be in a first block of Tp/4 correlator output samples (as also shown in FIG. 6 602 for this example), the channel response to the second transmitter will be in the next block of Tp/4 correlator output samples (as shown in FIG. 6 604), and so forth (as shown in FIG. 6 606 and 608).

The channel estimate is passed to equalization circuitry 905 so that proper equalization of the data blocks on the occupied subcarriers may be performed. The signal output from circuitry 905 comprises an appropriately equalized data signal that is passed to a user separation circuitry 906 where an individual user's signal is separated from the data signal (the transmission from a single user corresponds to a transmission from each transmitter at the user). The user separation can be performed in time-domain or frequency-domain and can be combined with the equalization circuitry 905. Finally a decision device 907 determines the symbols/bits from the user-separated signal that were transmitter.

Figure 10:
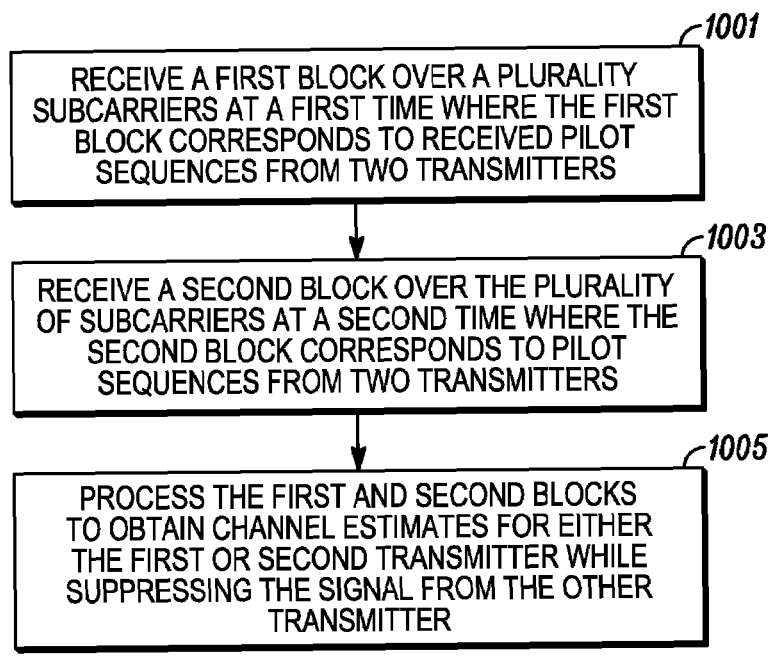
FIG. 10 is a flow chart of a receiver in accordance with some embodiments of the invention.

FIG. 10 is a flow chart representation of an embodiment of a receiver (e.g., base station) that will determine channel estimates from one of two transmitters. In block 1001, the receiver receives a first block over a plurality of subcarriers at a first time, wherein the first block comprises a first pilot sequence with a first time shift from a first transmitter and a second pilot sequence with a second time shift from a second transmitter. Then in block 1003, the receiver receives a second block over the plurality of subcarriers at a second time, wherein the second block comprises a third pilot sequence with a third time shift from the first transmitter and a fourth pilot sequence with a fourth time shift from the second transmitter, wherein the third time shift depends on the first time shift and the fourth time shift depends on the second time shift. Finally in block 1005, the receiver processes the first block and the second block to recover channel estimates for one of the first transmitter and the second transmitter, while suppressing the signal from the other transmitter.

Figure 11:
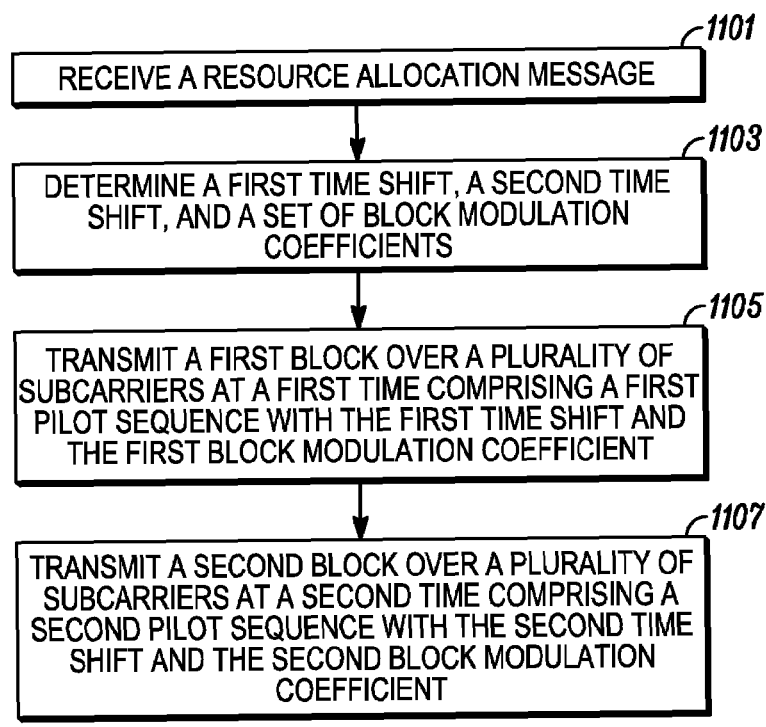
FIG. 11 is a flow chart of a transmitter in accordance with some embodiments of the invention.

FIG. 11 is a flow chart representation of an embodiment of a transmitter that will create a pilot sequence. In block 1101, the transmitter receives a resource allocation message from the receiver that will receive the transmitter's pilot sequence. In block 1103, the transmitter determines, based on the resource allocation message, a first time shift, a second time shift, and a set of block modulation coefficients. Then in block 1105, the transmitter transmits a first block over a plurality of subcarriers at a first time, wherein the first block comprises a first pilot sequence with the first time shift and is multiplied by the first block modulation coefficient. Finally, in block 1107, the transmitter transmits a second block over the plurality of subcarriers at a second time, wherein the second block comprises a second pilot sequence with the second time shift and is multiplied by the second block modulation coefficient, wherein the second time shift depends on the first time shift.

Figure 12:
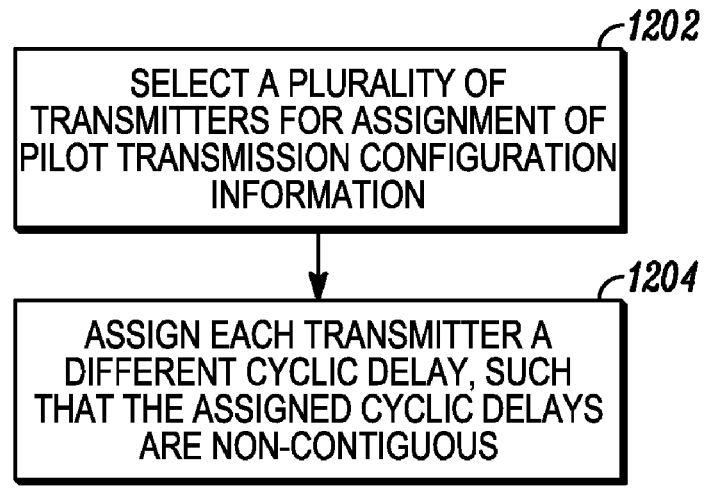
FIG. 12 is a flow chart of a method in accordance with some embodiments of the invention.

In an additional embodiment, each of a plurality of transmitters is assigned a different cyclic shift value from a set of cyclic delay values to be used for pilot transmission on a pilot block. The different cyclic delay values are chosen and assigned in a manner that increases the separability of the channel estimates of the transmitters at a receiver by increasing the spacing between the assigned cyclic shift values. Consider a system where the cyclic delay values available for assignment to transmitters are T0+k*T1, where k is a non-negative integer <=kmax. In one aspect of this embodiment, when the number of transmitters being assigned to transmit a pilot in a pilot block is less than kmax and greater than one, then the cyclic delay values (or values of k) assigned to the transmitters are non-contiguous. Non-contiguous means that there are at least two cyclic delay values that are not assigned to a transmitter, a first unassigned cyclic delay and a second unassigned cyclic delay, and that at least one cyclic delay (a third cyclic delay), which has a value between the first unassigned cyclic delay and the second unassigned cyclic delay is assigned to a transmitter. In addition, the cyclic delay values assigned to the transmitters are preferably maximally separated. For example, if there are four possible cyclic shift values of 0, T1, 2T1, and 3T1 in a pilot block of length 4T1 and two transmitters are being assigned to transmit in a pilot block, the separation between the assigned cyclic delays would be chosen as 2T1 to provide maximal separation (note that when the pilot block length is 4T1, the cyclic delay values of 0 and 3T1 are actually adjacent rather than maximally separated, since the cyclic delays are circular delays). For Example, the first transmitter can be assigned a cyclic shift of 0 and the second transmitter can be assigned acyclic shift of 2T1. By assigning maximally separated cyclic delays to the transmitters, extra protection is provided against unexpected channel conditions, such as channels where the delay spread is longer than the difference between consecutive cyclic delays. A flow chart for this embodiment is shown in FIG. 12. In step 1202, a plurality of transmitters is selected for assignment of pilot transmission configuration information. Each of the plurality of transmitters is to be assigned a pilot transmission configuration. In step 1204, a different cyclic delay is assigned to each of the plurality of transmitters from a set of cyclic delays, for pilot transmission by each of the transmitters wherein the cyclic delays are assigned to the transmitters such that the assigned cyclic delay values are non-contiguous (not all contiguous). The non-contiguous assignment may further comprise leaving a first cyclic delay unassigned and a second cyclic delay unassigned, and may further comprise assigning at least one of the cyclic delays having a value between the first unassigned cyclic delay and the second unassigned cyclic delay to a transmitter. The method may further comprise assigning non-consecutive cyclic delays to two of the plurality of transmitters, where at least one of the two transmitters has a channel delay spread that exceeds the spacing between adjacent cyclic delay values of the set of cyclic delay values.

Figure 13:
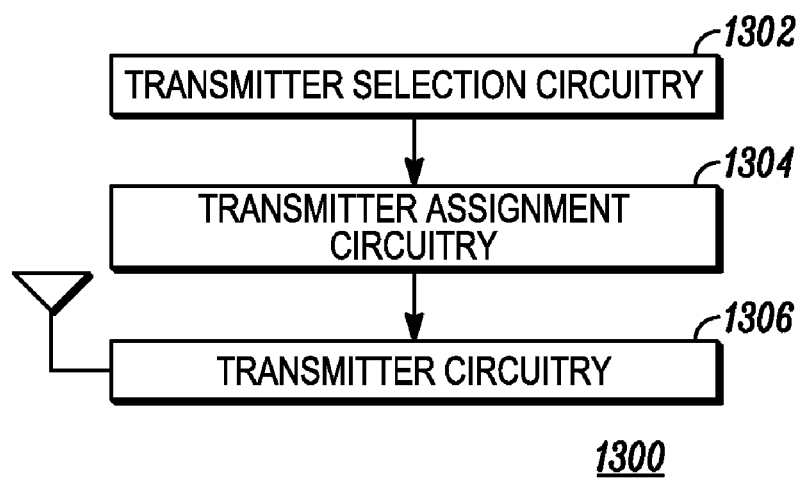
FIG. 13 is a block diagram of a controller in accordance with some embodiments of the invention.

A block diagram of a controller unit in accordance with the embodiment of FIG. 12 is shown in FIG. 13. The controller unit 1300 includes transmitter selection circuitry 1302, for selecting a plurality of transmitters for assignment of pilot transmission configuration information, transmitter assignment circuitry 1304, for providing the cyclic delay assignment information, and transmitter circuitry 1306, for transmitting the assignment information. Controller unit 1300 may be embedded in a communication unit such as a base station, and is coupled to the transmitter of the communication unit to transmit the assignment information to the plurality of transmitters.

Although some embodiments of the present invention use the same block length and repetition factor (for IFDMA) or subcarrier mapping (for DFT-SOFDM) for each of the pilot blocks within a burst, alternate embodiments may use a plurality of block lengths and/or a plurality of repetition factors and/or subcarrier mappings for the plurality of pilot blocks within a burst. Note that different bock lengths provide different subcarrier bandwidths, which may further enhance the channel estimation capability.

The pilot configuration for a burst (e.g., the first or second configuration of FIG. 13) is preferably assigned by the base station dynamically based on channel conditions, such as the rate of channel variations (Doppler), but the assignment can be based on requests from the mobile unit, or on uplink measurements made by the base unit from previously received uplink transmissions. As described, the determination may be based on a channel condition such as Doppler frequency or on a number of antennas used for transmitting data symbols, and the determination can be made by the base unit, or by a mobile unit which then sends a corresponding request to the base unit. In systems with a scheduled uplink, the base unit can then assign the appropriate pilot format to the mobile unit for the subsequent transmissions from the mobile unit.

While the invention has been particularly shown and described with reference to a particular embodiment, it will be understood by those skilled in the art that various changes in form and details may be made therein without departing from the spirit and scope of the invention. It is intended that such changes come within the scope of the following claims.

What is claimed is:

1. A method for pilot transmission in a wireless communication terminal, the method comprising:
    determining, at the wireless communication terminal, a first cyclic shift and a second cyclic shift;
    transmitting, from the wireless communication terminal, a first block over a first plurality of subcarriers at a first time, wherein the first block comprises a first pilot sequence with the first cyclic shift; and
    transmitting, from the wireless communication terminal, a second block over a second plurality of subcarriers at a second time, wherein the second block comprises a second pilot sequence with the second cyclic shift,
    wherein the second cyclic shift differs from the first cyclic shift.

2. The method of claim 1, receiving a resource allocation message at the wireless communication terminal, determining the first cyclic shift and the second cyclic shift based on the resource allocation message.

3. The method of claim 2, determining the first cyclic shift and the second cyclic shift based on the resource allocation message and predetermined mapping rules.

4. The method of claim 3 wherein the set of block modulation coefficients are derived from a set of orthogonal sequences.

5. The method of claim 1, wherein the second plurality of subcarriers at the second time is equal to the first plurality of subcarriers at the first time.

6. The method of claim 5 further comprising:
    determining, at the wireless communication terminal, a set of block modulation coefficients;
    multiplying the first pilot sequence with the first cyclic shift by a first coefficient of the set of block modulation coefficients;
    multiplying the second pilot sequence with the second cyclic shift by a second coefficient of the set of block modulation coefficients.

7. The method of claim 6 further comprising
    receiving a resource allocation message at the wireless communication terminal,
    determining the first cyclic shift, the second cyclic shift, and the set of block modulation coefficients based on the resource allocation message.

8. The method of claim 6, determining the first cyclic shift, the second cyclic shift and the set of block modulation coefficients based on the resource allocation message and predetermined mapping rules.

9. The method of claim 1, wherein the first and second cyclic shifts are non-contiguous.

10. The method of claim 9 wherein the second set of cyclic shifts is equal to the first set of cyclic shifts plus a non-zero constant.

11. The method of claim 1, wherein the second cyclic shift depends on the first cyclic shift.

12. The method of claim 1, wherein the first pilot sequence differs from the second pilot sequence.

13. The method of claim 1, wherein the second pilot sequence equals the first pilot sequence.

14. The method of claim 1, wherein the first cyclic shift is selected from a first set of cyclic shifts and the second cyclic shift is selected from a second set of cyclic shifts, wherein the second set of cyclic shifts differs from the first set of cyclic shifts.

15. The method of claim 1 further comprising:
    transmitting, from the wireless communication terminal, the first block at the first time and the second block at the second time within a transmission interval;
    transmitting, from the wireless communication terminal, a plurality of data blocks within the transmission interval, wherein the plurality of data blocks is time division multiplexed with the first and the second block within the transmission interval.

16. The method of claim 1, wherein the first and second cyclic shifts are non-contiguous.

17. A method in a base station for assigning pilot transmission configurations, the method comprising:
    serving a plurality of transmitters;
    assigning, by the base station, a cyclic shift for pilot transmission to each of the plurality of transmitters, the cyclic shifts selected from a set of cyclic shifts,
    wherein the cyclic shifts are assigned to the plurality of transmitters such that the cyclic shifts assigned to at least two of the plurality of transmitters are non-contiguous.

18. The method of 17 wherein assigning the cyclic shifts comprises leaving a first cyclic shift unassigned and leaving a second cyclic shift unassigned, and assigning at least one of the cyclic shifts having a value between the first unassigned cyclic shift and the second unassigned cyclic shift.

19. The method of claim 17 wherein assigning the cyclic shifts comprises assigning non-consecutive cyclic shifts to two of the plurality of transmitters.

20. The method of claim 17 wherein a first transmitter of the plurality of transmitters is a first user terminal and a second transmitter of the plurality of transmitters is a second user terminal.

21. The method of claim 17 wherein a first transmitter of the plurality of transmitters includes a first antenna of a user terminal and a second transmitter of the plurality of transmitters includes a second antenna of the user terminal.

22. The method of claim 17 further comprising assigning, by the base station, the cyclic shifts to the plurality of transmitters for pilot transmission at a first time on a first block.

23. The method of claim 17 further comprising indicating the assigned cyclic shift for at least one of the plurality of transmitters based on a resource allocation message.

24. The method of claim 23, wherein the resource allocation message comprises the cyclic shift for the at least one of the plurality of transmitters.

25. The method of claim 23, wherein the cyclic shift for the at least one of the plurality of transmitters is specified based on the resource allocation message and predetermined mapping rules.

26. The method of claim 17 further comprising assigning, by the base station, a set of block modulation coefficients for at least one of the plurality of transmitters for pilot transmission.

27. The method of claim 26 further comprising indicating the assigned cyclic shift and the set of block modulation coefficients for at least one of the plurality of transmitters based on a resource allocation message and predetermined mapping rules.

* * * * *